Aug. 25, 1964   E. C. JOLES   3,145,732
HYDRAULIC PRESSURE RELIEF VALVE
Filed Aug. 27, 1962
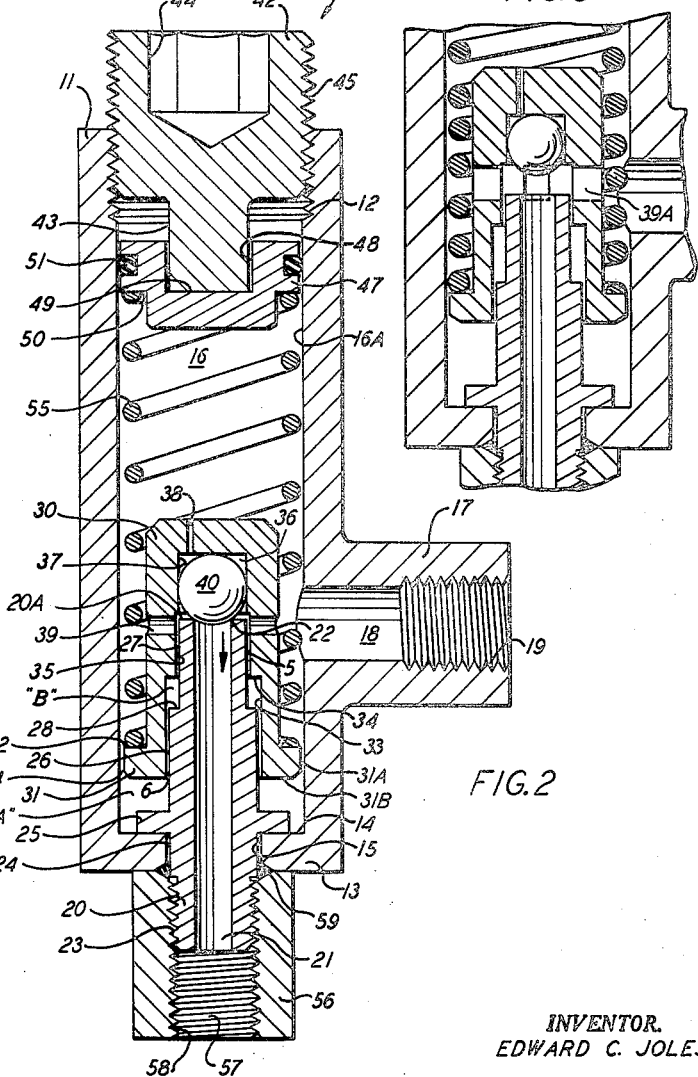
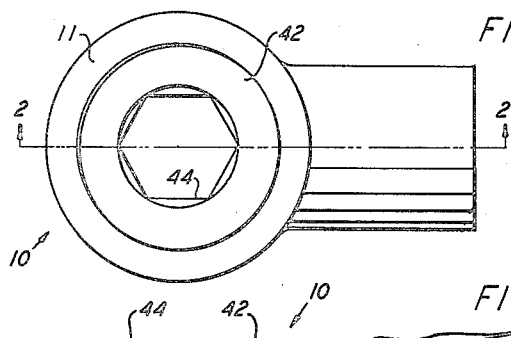
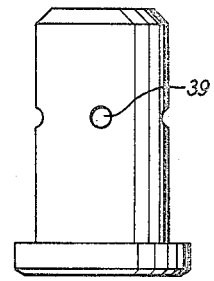
FIG. 3
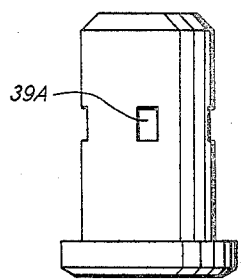
FIG. 4
INVENTOR.
EDWARD C. JOLES
BY
William Frederick Werner
ATTORNEY

3,145,732
HYDRAULIC PRESSURE RELIEF VALVE
Edward C. Joles, Monsey, N.Y., assignor to Spartan Hydraulics, Inc., Yonkers, N.Y., a corporation of New York
Filed Aug. 27, 1962, Ser. No. 219,460
3 Claims. (Cl. 137—514.3)

This invention related to hydraulic pressure relief valves and more particularly to high pressure, high velocity hydraulic pressure relief valves provided with dampening mechanisms for the elimination of vibration and chatter.

An object of the present invention is to prolong the life of the valve seat and to eliminate high velocity screech and chatter noises inherent in hydraulic pressure relief valves.

Another object of the present invention is to improve the construction of a hydraulic pressure relief valve while reducing the cost of manufacture and improving the ease with which the inner workings of the valve may be repaired.

And still another object of the present invention is to provide a hydraulic pressure relief valve with a ball element adapted to seat positively on a valve seat located at the opening of a tubular conduit under control of a dash pot action.

Other objects of the present invention will be pointed out in part and become apparent in part in the following specification and claims.

Referring to the drawing in which similar characters of reference indicate corresponding parts in all the figures:

FIGURE 1 is a plan view of the new and improved hydraulic pressure relief valve.

FIGURE 2 is a vertical sectional view taken on line 2—2 of FIGURE 1.

FIGURE 3 is a side elevational view of the piston showing the shape of the ports to be round.

FIGURE 4 is a side elevational view of a modified form of piston showing the shape of the ports to be rectangular.

FIGURE 5 illustrates the modified form of piston, with the valve removed from the valve seat by force of fluid pressure.

In proceeding with this invention, the new and improved hydraulic pressure relief valve is generally indicated by reference numeral 10. Hydraulic pressure relief valve 10 consists of a circular hollow housing 11, provided with screw threads 12 in one end and a flange 13 having a wall 14 and an annular recess 15 in the opposite end. Circular hollow housing 11 is also provided with a chamber 16 defined by a chamber wall 16A and a projection 17 having an outlet aperture 18 in communication with chamber 16. Projection 17 may be provided with a threaded area 19.

A tubular conduit 20 is provided axially with an inlet aperture 21 and a valve seat 22. Externally tubular conduit 20 is provided with a stepped surface consisting of a threaded area 23, a clearance band 24, a disk 25, a body diameter 26, a reduced diameter 27 and a shoulder 28.

A piston 30 is provided externally with a circular projection 31 having a spring seat 32. Axially, piston 30 is provided with an enlarged sliding surface 33, a rim 34, a reduced diameter sliding surface 35 and a cavity 36 having a circular wall 37. Piston 30 is also provided with a bleeder orifice 38 and a plurality of ports 39. A valve element 40, illustrated as a ball serving the function of a valve plug or valve element is secured in cavity 36 by means of a squeeze or drive fit provided by circular wall 37.

A spring adjusting collar 42 provided with a circular shank 43, a wrench receiving aperture 44 and threads 45 is rotatively mounted in screw threads 12 of circular hollow housing 11.

A circular cap 47 is provided with a circular depression 48 having a bottom 49, a reduced diameter forming a spring seat 50 and a circular recess provided with a fluid tight packing 51 illustrated as an O-ring. Circular cap 47 is slidably mounted in chamber 16 with the fluid tight packing engaging wall 16A of chamber 16. Circular shank 43 fits into circular depression 48 and abuts bottom 49.

A coil spring 55 located in chamber 16 surrounds piston 30 and engages spring seat 32 on one end and spring seat 50 on the other end.

A tubular connection 56 having an inlet 57 provided with threads 58 is rotatively connected to threaded area 23 with a fluid tight packing 59 interposed at the intersection of tubular connection 56 with tubular conduit 20 and flange 13.

It will be noted that the component parts of hydraulic pressure relief valve 10 may be manufactured on automatic screw or other automatic machinery for low cost mass production. Valve 10 is adaptable for use with very high flow velocities at very high temperatures and very high pressures.

The hydraulic pressure relief valve is assembled and operates as follows:

Tubular conduit 20 is passed into chamber 16 by-passing screw threads 12, with disk 25 resting against wall 14. Fluid tight packing 59 is set in place while tubular connection 56 rotatively engages threaded area 23 through threads 58 thereby securing tubular connection 20 to circular hollow housing 11.

Piston 30, with valve element 40 secured in cavity 36, is slidably positioned over tubular conduit 20 with enlarged sliding surface 33 slidingly engaging body diameter 26 and with reduced diameter sliding surface 35 slidingly engaging reduced diameter 27 with narrow annular spaces or passages 5 and 6 between the piston and the tubular conduit.

Coil spring 55 is placed in chamber 16 with one end of the coil spring engaging spring seat 32. Circular cap 47 provided with fluid tight packing 51 slidably engages chamber wall 16A with spring seat 50 engaging the other end of coil spring 55. Spring adjusting collar 42 through threads 45 rotatively engages screw threads 12 with circular shank 43 abutting bottom 49, thereby to compress coil spring 55 to the desired tension. Thus, valve element 40 engages valve seat 22 with chamber 16 fluid tight between fluid tight packings 51 and 59.

It will be noted, that as illustrated in FIGURE 2, a space A is formed between circular projection 31 and wall 14 including disk 25, and a space B is formed between shoulder 28 and rim 34. With fluid in chamber 16 spaces A and B become dash pots. The narrow passage 4 between the outside diameter 31A of circular projection 31 and chamber wall 16A is an annular escape passage 4, for fluid trapped in space A.

Fluid under pressure will enter inlet 57 and pass into inlet aperture 21 where seated valve element 40 will block further passage of the fluid until the pressure of the fluid exceeds the pressure of coil spring 55.

With the advent of increased fluid pressure valve element 40 is lifted off of valve seat 22 whereby the fluid flows through ports 39 into chamber 16 and to and through outlet aperture 18.

With a reduction in the fluid pressure, coil spring 55 manifests itself to force piston 30 in the direction of the arrow in FIGURE 2 whereby valve element 40 approaches valve seat 22 for fluid sealing contact. It is during this movement of piston 30 that the condition is arrived at where the fluid pressure slightly exceeds the pressure of the spring: whereby the valve element 40 will vibrate against valve seat 22 causing noise, constituting chattering and screeching. The chattering noise is the valve element 40 hammering against the valve seat 22. The screeching noise is caused by the valve element 40 restricting the fluid flow from inlet aperture 21 passed valve seat 22 to ports 39. Dash pots A and/or B eliminate the vibration of piston 30 and valve element 40.

It is to be noted that chattering and screeching while separate noises occur simultaneously. Chattering is due to vibration of the piston and valve element against the valve seat. Screeching is due to vibration of the piston and valve element varying the space between the valve element and valve seat as the valve element approaches the seat to restrict the flow area of the fluid exiting from the inlet aperture.

Dash pot A functions when the bottom 31B of circular projection 31 forces the fluid in space A against wall 14 and disk 25 whereby the fluid passes through narrow annular escape passage 4 into chamber 16. The size of narrow annular escape passage 4 determines the speed of dash pot action A and/or the rate of flow of fluid from space A to chamber 16.

Dash pot B functions when rim 34 forces the fluid in space B against shoulder 28 whereby the fluid passes through narrow annular escape passages 5 and 6.

Bleeder orifice 38 allows fluid entrapped in cavity 36 to escape into chamber 16.

It has been found advantageous to provide rectangular shaped ports 39A for very high velocity fluids passing through the relief valve.

By way of example, let it be assumed that fluid flowing at the rate of one gallon per minute has sufficient pressure to lift valve element 40 away from valve seat 22 so that the horizontal diameter of ports 39 is parallel to the top 20A of tubular conduit 20. Should the fluid flow increase to two gallons per minute with an increase in fluid pressure, then valve element 40 and piston 30 will move further away from valve seat 22 so that the bottom of round ports 39 will be horizontally level with top 20A.

If the port has a square or rectangular shape as illustrated in FIGURES 4 and 5, then as the fluid flow increases, the area of the port increases, above top 20A, in direct proportion, to accommodate the increased fluid flow. Because a square port or a rectangular port provides a greater area for a given size over a round port having a diameter of a comparable size, the fluid will flow more quickly through the recangular ports and the rectangular ports can be made to accommodate a greater flow velocity over a round port of a similar size.

The rectangular ports 39A provide a linear pressure drop over a wider flow range when the flow rate is recorded on a graph chart.

Having shown and described preferred embodiments of the present invention, by way of example, it should be realized that structural changes could be made and other examples given without departing from either the spirit or scope of this invention.

What I claim is:

1. A hydraulic pressure relief valve consisting of a housing having a chamber wall defining a chamber, screw threads in one end of said housing, a flange in the other end of said housing and an outlet aperture in communication with said chamber, a tubular conduit having an inlet aperture and a valve seat, means securing said tubular conduit in said flange with said tubular coduit projecting into said chamber, a piston having a circular projection and a plurality of ports connecting said inlet aperture with said chamber, a valve element fixed to said piston, a spring adjusting collar rotatively engaging said screw threads, a circular cap provided with fluid tight packing slidably mounted in said chamber with said fluid tight packing engaging said chamber wall, resilient means interposed between said piston and said circular cap, said spring adjusting collar engaging to slide said circular cap along said chamber wall to vary the tension of said resilient means, said resilient means forcing said valve element into engagement with said valve seat for closing said plurality of ports from said inlet aperture, and means for preventing vibration of said piston and chatter between said valve element and said valve seat which includes a first dash pot space defined by said flange and said circular projection and a first narrow escape passage between said circular projection and said chamber wall and a second dash pot space defined by a shoulder on said tubular conduit and a rim on said piston a second and narrow annular escape passage between said piston and said tubular conduit, said last mentioned passage connecting said first and second dashpot spaces, at least a portion of a fluid contained in said first dashpot space being forced through said second passage to thereby flow through said second dashpot space as said resilient element forces said valve element into engagement with said valve seat.

2. A hydraulic pressure relief valve consisting of a housing having a chamber and an outlet aperture, a tubular conduit provided with a shoulder, an inlet aperture and a valve seat, means securing said tubular conduit in said chamber, a piston having a circular projection, a cavity, a rim and a plurality of ports, a ball valve element secured in said cavity, said piston slidably mounted upon said tubular conduit with said ball valve element engageable and disengageable with said valve seat, a first dash pot formed in said chamber by said circular projection, a second dash pot formed between said rim of the piston and said shoulder on the tubular conduit, resilient means urging said ball valve element into engagement with said valve seat, and a passage connecting said first and second dashpot, at least a portion of a fluid contained in said first dashpot being forced through said passage to thereby flow through said second dashpot as said resilient element urges said ball valve element into engagement with said valve seat.

3. A hydraulic pressure relief valve consisting of a circular hollow housing provided with screw threads in one end, and a flange having a wall and an annular recess in the other end, a chamber having a chamber wall formed in said circular hollow housing, a circular projection, having an outlet aperture in communication with said chamber, integrally connected to said circular hollow housing, a tubular conduit provided axially with an inlet aperture and a valve seat, and externally with a stepped surface comprising a threaded area, a clearance band, a disk, a body diameter, a reduced diameter and a shoulder, a tubular connection having an inlet aligned with said inlet aperture and threads rotatively engaging said threaded area to secure said disk against said wall with said clearance band located in said annular recess, a piston provided with a circular projection, an enlarged sliding surface, a rim, a reduced diameter sliding surface, a cavity and a plurality of ports, a ball valve element secured in said cavity, said enlarged sliding surface slidingly engaging said body diameter, said reduced diameter sliding surface slidingly engaging said reduced diameter, said ball valve element engaging and disengaging said valve seat, a dash pot formed between said chamber wall and said circular projection and said disk and wall, a second dash pot formed between said rim, shoulder, enlarged sliding surface and said reduced diameter, a spring adjusting collar provided with a circular shank rotatively mounted in said screw threads, a circular cap having a circular recess, fluid tight packing in said recess, said circular cap slidingly mounted in said chamber with said fluid tight packing engaging said chamber wall and said circular shank abutting said circular cap and a coil spring interposed between said circular cap and said circular projection.

References Cited in the file of this patent

UNITED STATES PATENTS

| | | |
|---|---|---|
| 715,425 | Schamp | Dec. 9, 1902 |
| 1,199,616 | Rushton | Sept. 26, 1916 |
| 1,252,940 | Osborne | Jan. 8, 1918 |
| 1,727,301 | Russell | Sept. 3, 1929 |
| 2,527,381 | St. Clair | Oct. 24, 1950 |
| 2,530,091 | Smith | Nov. 14, 1950 |
| 2,538,364 | James | Jan. 16, 1951 |
| 2,699,178 | Adams | Jan. 11, 1955 |
| 2,933,103 | Campbell | Apr. 19, 1960 |
| 3,029,834 | Vanden Haek | Apr. 17, 1962 |